United States Patent

Narang

[15] 3,688,273

[45] Aug. 29, 1972

[54] DIGITAL DATA COMMUNICATION SYSTEM PROVIDING A RECIRCULATING POLL OF A PLURALITY OF REMOTE TERMINAL UNITS

[72] Inventor: Chander K. Narang, Sierra Madre, Calif.

[73] Assignee: Burroughs Corporation, Detroit, Mich.

[22] Filed: Nov. 9, 1970

[21] Appl. No.: 87,914

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,512,133 | 5/1970 | Bennett et al. | 340/172.5 |
| 3,550,133 | 12/1970 | King et al. | 340/172.5 |
| 3,539,998 | 11/1970 | Belcher | 340/172.5 |
| 3,456,242 | 7/1969 | Lubkin et al. | 340/172.5 |
| 3,432,813 | 3/1969 | Annunziata et al. | 340/172.5 |
| 3,396,372 | 8/1968 | Calvert | 340/172.5 |
| 3,456,244 | 7/1969 | Seichter et al. | 340/172.5 |

*Primary Examiner*—Gareth D. Shaw
*Assistant Examiner*—Ronald F. Chapuran
*Attorney*—Christie, Parker and Hale

[57] ABSTRACT

A digital data transmission system in which a string of polling messages stored in the memory of a computer system are transmitted over a communication line to a remote station having a plurality of input-output units. An input-output control unit, without interrupting the processor of the computer system, continuously transmits the polling messages to the remote station to poll the input-output units. A counter is counted in response to control characters which are stored as part of the polling string and divide the string into equal blocks. The counter controls logic for resetting the memory address back to the base address of the polling string when the entire string has been transmitted, so that the string is repeated without intervention of the processor.

10 Claims, 6 Drawing Figures

INVENTOR

DIGITAL DATA COMMUNICATION SYSTEM PROVIDING A RECIRCULATING POLL OF A PLURALITY OF REMOTE TERMINAL UNITS

FIELD OF THE INVENTION

This invention relates to digital data communication systems and, more particularly, is concerned with polling of a plurality of remote input-output devices from a central processor.

BACKGROUND OF THE INVENTION

Digital data communication systems are well known in which a plurality of input-output devices located at a remote station are arranged to communicate with a digital data processor located at a central station. When an input-output device has information which it wants to send into the central processor, instead of sending a signal into the central processor which might interrupt the operation out of the processor, the input-output device at the remote station waits to be polled by the central processing system. In order to poll a remote station having a plurality of input-output devices, a polling message is transmitted to the remote station which signals that the station is being polled and provides the address of the particular input-output unit at the remote station which is being polled. If the input-output device has data ready to be transferred to the central processing system in response to the poll, it begins to transmit the data on the line back to the central station. If it does not have any information ready to transmit to the central station, it returns a negative acknowledgement.

One such polling arrangement is described in detail in U.S. Pat. No. 3,512,133 in which a processor, in response to a "poll" command, initiates an input-output operation through a multi-line control unit for polling a plurality of input-output units over a common transmission line. The polling messages are stored in the main memory, the polling messages being sent out in sequence to poll each of the input-output units. After each polling message goes out on the line, the multi-line control unit automatically switches from the "-transmit" status to a "receive" status so as to either receive the return message from the polled input-output unit or to receive the negative acknowledgement. In response to the latter condition, the multi-line control unit returns to a "transmit" status for transmitting the next polling message. This operation continues until one of the input-output units polled returns a message, in which case the message is stored in the main memory, or until the last of the polling messages in the polling string stored in memory have been transmitted.

However, when the remote station units are experiencing a light load, it is desirable to be able to continuously poll over long periods of time. The polling arrangement described in the above-identified patent can only read out the polling string one time, and then the processing system must be interrupted to permit a new polling command to be executed. It is therefore desirable to provide an arrangement which permits the polling string to be repeatedly read out of main memory by the multi-line control without interruption of the processor.

The present invention is directed to an improvement of the polling system described in the above-identified patent which permits the multi-line control to return to the base address of the polling string in main memory when the last polling message in the string has been transmitted and a negative acknowledgement received. One of the problems of providing such a recirculating polling arrangement is that the multi-line control, which must service as many as 36 separate communication lines, has no facility for storing the starting addresses of the buffer areas set aside in main memory for each of the communication lines. Therefore, once the address of the last character in the polling string has been reached, there has been no way of re-establishing the initial address of the polling string without intervention of the processor.

SUMMARY OF THE INVENTION

The present invention is directed to an arrangement for providing a continuously recirculating poll which permits a string of polling messages to be read out of main memory repeatedly without intervention of the processor. This is accomplished by providing a counter which is time-shared by each communication line serviced by the multi-line control. As the characters of a polling string are transmitted over a particular transmission line to the remote station, the associated counter is actuated each time a special character is encountered in the polling string being transmitted. By arranging the special characters at equal intervals in the polling string, e.g., following blocks of 100 characters, the counter establishes the number of blocks in the polling string. The end of the string, which coincides with the end of a block, is identified by a pair of the special characters. When the end of the string is encountered, the counter is reset back to zero and, at the same time, the address of the last character in the string is decremented a corresponding number of steps of 100 addresses per step.

BRIEF DESCRIPTION OF THE DRAWINGS

For a better understanding of the invention, reference should be made to the accompanying drawings wherein.

DETAILED DESCRIPTION

Figure 1:
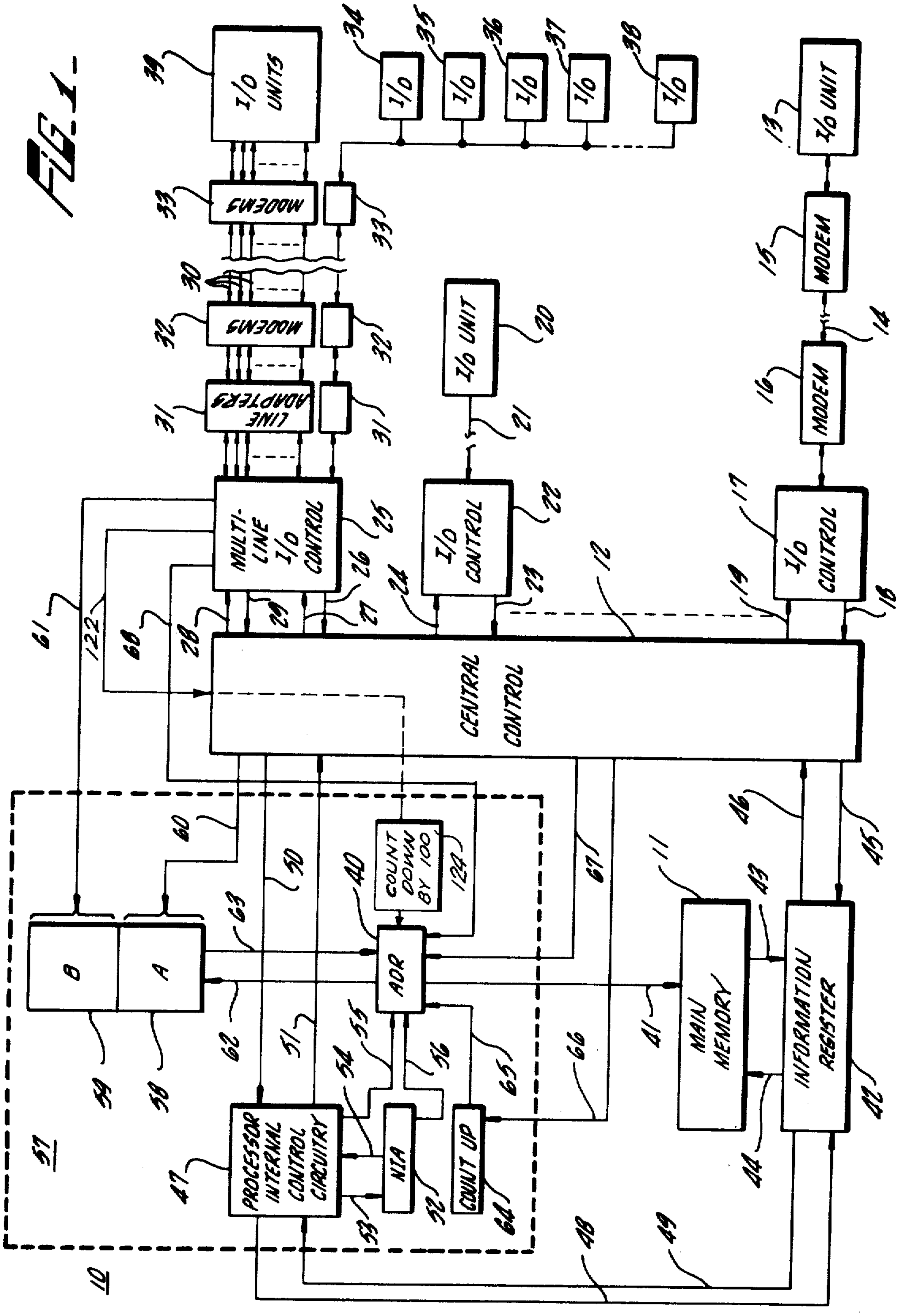
FIG. 1 shows a block diagram of a computer system incorporating the present invention.

FIG. 1 depicts a computer system of the type units. in the aforesaid patent. The computer system described in said patent and on which the present invention is an improvement is manufactured by the Burroughs Corporation and sold as the B-3500 computer with the B-3500 multi-line control. The B-3500 Processor, Main Memory, Central Control, and Multi-line Control are described in technical detail in Technical Manuals 1028958, 1028982, 1028974, and 1038650, respectively, published by and available on request from Burroughs Corporation. It depicts central processing unit 10, main memory 11, and central control unit 12. Main memory 11 is time-shared by processor 10 and a plurality of input-output units Access to memory 11 by the processor and the input-output units is controlled by the central control unit 12. Consequently, a plurality of input-output operations may proceed simultaneously and many units may thereby utilize the system simultaneously in such a way that each can be completely unaware of the use of the system being made by others. Whenever the processor or any of the input-output units desire access to memory 11, they indicate this desire by transmitting a signal to central control unit 12. The central control unit then handles these requests for memory access and allocates memory accesses to the processor and the input-output units. Central control unit 12 has a fixed number of input-output channels, each of which is reserved for a single input-output control unit. Central control unit 12 may be considered, for purposes of description herein to have 20 such input-output channels. A remote input-output unit 13 is connected to a first input-output channel of central control unit 12 through an input-output control unit 17 via modulator-demodulators 15 and 16 (hereinafter referred to as a modem), at either end of a data communication line 14. The modems may be standard telephone data sets, such as the Bell System 202D Data Set referred to in U.S. Pat. No. 3,407,387. Such data sets are available from the telephone companies for transmitting binary information over standard telephone line equipment.

The first input-output channel is indicated by lines 18 and 19. Although lines 18 and 19 are shown in FIG. 1 as single lines for the purposes of clarity, as are other lines depicted in the drawing, in actuality many lines will be utilized to transmit signals over the indicated paths. Input-output unit 20 is shown connected to the 18th input-output channel by line 21 and input-output control unit 22. The 18th input-output channel is similarly indicated by lines 23 and 24.

Some input-output units which must communicate with central control unit 12 are much slower than others with respect to their speed of operation. The allocation of a separate input-output channel to central control unit 12 for each such slower speed unit would be uneconomical. Transmission of data over data communication lines, for example, is relatively slow compared to the rate of transmission between a computer system and an input-output unit connected directly thereto. In FIG. 1 a multi-line input-output control unit 25 is utilized to connect a plurality of such data communication lines to central control unit 12 by means of only two input-output channels. These two input-output channels, the 19th and 20th of central control unit 12, are indicated by the lines 26 and 27 and by the lines 28 and 29, respectively.

For purpose of description herein, the multi-line control unit 25 will be considered to be connected to 36 data communication lines 30. Each of the data communication lines connects one or more input-output units to the multi-line control unit 25 by means of a line adapter 31, a first modem 32, and a second modem 33. A first one of the data communication lines 30 connects a plurality of input-output units 34, 35, 36, 37 and 38 via a single one of the adapters 31 to multi-line control unit 25. The remaining data communication lines similarly connect input-output units 39 to the multi-line control unit 25. The adapters, modems, and input-output units associated with these remaining data communication lines 30 are each shown as a single block for purposes of illustration. The 19th input-output channel is utilized to transmit commands between central control unit 12 and multi-line control unit 25, while the 20th input-output channel is utilized to transmit data between these control units. Data transmitted between the computer system and the 36 input-output units connected to multi-line control unit 25 via the data communication line 30 is thus funneled into a single input-output channel connecting control units 25 and 12. As a result the total number of input-output units which may be serviced by central control unit 12 has been increased from 20 to 54.

Within the central processing unit 10 is address register 40. Address register 40 is utilized to address main memory 11 via line 41. Information is read from memory 11 to information register 42 via line 43 and is written into memory 11 from register 42 via line 44. Register 42 is connected to central control unit 12 via lines 45 and 46 and to control circuitry 47 within processor 10 via lines 48 and 49. Whether a Read or Write operation is performed is determined by a timing signal presented by central control unit 12 to register 42 in response to signals presented to it by the unit allocated access to memory 11. Control circuitry 47 is connected to central control unit 12 via lines 50 and 51, to Next Instruction Address register 52 within processor 10 by lines 53 and 54, and to address register 40 via line 55. Register 52 contains the address of the next instruction of a stored program being executed by processor 10. Register 52 is connected to address register 40 via line 56. Also within processor 10 is address memory 57. Address memory 57 comprises a section 58 and a section 59, which will hereafter sometimes be referred to as the A and B sections, respectively, of the address memory 57. Address memory 57 may advantageously be made up of a number of cards containing integrated transistor storage devices. Although address memory 57 is made up of such integrated circuitry it operates in the manner of a word-organized core memory. Section A of Address memory 57 is addressed via line 60 by central control unit 12 only. Section A of address memory 57 has two word locations reserved therein for each of the 20 input-output channels which connect control unit 12 to the input-output units and several additional word locations reserved for use by the processor itself. Section B of address memory 57 is addressed via line 61 by multi-line control unit 25 only. Section B has two word locations reserved therein for each of the 36 data communication lines 30 serviced by multi-line control unit 25. Address register 40 serves as an information register for address memory 57 as well as an address register for memory 11. Addresses in main memory 11 are written into address memory 57 from register 40 via line 62 and are read from memory 57 into register 40 via line 63. The storing of addresses in the memory and transferring these addresses to the address register of the main memory is described in more detail in U.S. Pat. No. 3,359,544.

When information is written into or read from memory 11 during any given memory cycle, the contents of address register 40 will automatically be counted up by circuitry 64 via line 65 prior to the next succeeding memory cycle. The counting up operation is under the control of central control unit 12 via line 66 connecting control unit 12 and count-up circuitry 64. For purposes of description herein, memory 11 will be assumed to store individually addressable four-bit digits. It will further be assumed, however, that these digits will ordinarily be written into and read from memory 11, two digits at a time. Thus, during each memory cycle, count-up circuitry 64 will ordinarily increase the contents of address register 40 by two.

During the operation of the systems shown in FIG. 1, input-output descriptors are transferred two digits at a time to the input-output control unit associated with the particular input-output unit to which they relate and to reserved locations within address memory 57. After such a command has been received in full, a channel descriptor word is stored in memory 11 at a predetermined location therein, thereby designating that the complete command has been received. The address to which this descriptor word is to be stored is fed into register 40 by central control unit 12 via line 67. When the input-output descriptor relates to an input-output unit associated with the multi-line control unit 25, the channel descriptor word stored in memory 11 via line 67 and the 19th input-output channel indicates that the 19th channel is again free to receive an input-output descriptor directed to a different one of the input-output units associated with multi-line control unit 25. The freeing of the 19th input-output channel after an input-output descriptor has been fully received enables the 19th input-output channel to receive a second input-output descriptor while the first is being executed by control unit 25. When the particular input-output descriptor has been executed by the multi-line control unit 25, a result descriptor word is stored in memory 11 at an address fed into register 40 from multi-line control unit 25 via line 68 connected between multi-line control unit 25 and address register 40. Consequently, additional input-output descriptors relating to other ones of the input-output units associated with control unit 25 may be received via the 19th input-output channel while several previously received descriptors are in the process of being executed by control unit 25. Thus, commands relating to different ones of the input-output units associated with control unit 25 may simultaneously be executed by control unit 25. Such operations are described in greater detail in the copending application of James Russell Bennett and Roger E. Packard referred to hereinabove.

The line adapters 31 associated with the data communication lines 30 enable input-output units of different types to be connected to the same input-output control unit. These line adapters provide a common interface between each of the input-output units associated with the multi-line control unit 25. Suitable line adapters are described, for example, in U.S. Pat. No. 3,390,379. Additionally, they change the electrical and logical levels of signals provided by the modems 32 and transform these signals into signals which are compatible with multi-line control unit 25. They also provide a timing function whereby they accommodate different clock rates required by the input-output units to the multi-line control unit 25. Furthermore, they provide bit handling circuitry and control circuitry whereby a bit may be temporarily stored and, additionally, provide logic circuitry for controlling the modems 32. Line adapters of this type are well known and have been designed to operate with different types of input-output units. The modems 32 and 33 modulate digital data prior to its transmission over the data communication lines 30 and demodulate such signals received over the data communication lines 30. Such modems are available, for example, through the American Telephone and Telegraph Company.

During the operation of the system depicted in FIG. 1, the central control unit 12 allocates accesses to main memory 11 requested by the processor, by input-output units associated with the first 18 input-output channels, and by input-output units associated with the 19th and 20th input-output channels via data communication lines 30 and multi-line control unit 25. All of these devices may be operating simultaneously such that each is virtually unaware that memory 11 is also being addressed by the other devices. Thus, while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle.

With respect to execution of commands by the system shown in FIG. 1, assume, for example, that the processor wishes to execute a command requested by software of the system. The address of the command to be executed is established in Next Instruction Address register 52. This address is transferred to address register 40 via line 56. During a first memory cycle granted to the processor, the first two digits of the command are read out of memory 11 into information register 42 and thence transferred via line 48 to processor control circuitry 47. At the end of this memory cycle the contents of register 40 are counted up by two by the counting circuitry 64 and the new contents of address register 40 are stored in a word location in Section A of address memory 57 reserved for the processor. By having granted memory to the processor during the memory cycle just discussed, the central control circuitry 12 automatically addresses the word location in address memory 57 reserved for the processor. Thus, at the end of the first memory cycle granted to the processor, the address of the next section of the command which the processor desires to execute is automatically stored in a location in Section A of address memory 57 which is reserved for the processor. When the processor is next granted access to memory 11, the address of the next section of the processor command is read from Section A of address memory 57 into address register 40 and the next two digits of the command are read from memory 11. The remainder of the command is fetched by the processor in a similar manner and the processor then commences to execute the command.

The readout of a data word proceeds in a manner identical to the readout of an instruction word. Processor requests for memory access may be transmitted to central control 12 via line 51 while grants of access to the processor may be transmitted to processor control circuitry 47 via line 50.

Requests for memory access by the input-output units proceed in a manner similar to that described for the processor. Thus, for example, if input-output unit 13 requests a memory access, this request will be transmitted via input-output control unit 17 and line 18 of the first input-output channel to central control unit 12. When memory access is granted to this input-output unit by central control unit 12, the central control unit 12 automatically addresses that location of Section A of address memory 57 which is reserved for the first input-output channel. Consequently, when input-output control unit 17 is in the midst of transferring data between input-output unit 13 and memory 11, this data will be transferred via register 42 and lines 45 and 46 into or from the addresses in memory 11 specified by the contents of the word location in Section A of memory 57 reserved for the first input-output channel. Time-sharing of a computer main memory 11 between a processor and input-output units such as units 13 and 20 by means of central control unit 12 and input-output control units 17 and 22 is known and will not be described at length herein. Such a modular computer system is described, for example, in U.S. Pat. No. 3,200,380.

The extension of such time-sharing to input-output units controlled by a single multi-line control unit has heretofore presented certain difficulties which, as described in the copending application of Bennett and Packard referred to previously, are eliminated by the use of address memory 57. Section B of address memory 57 is not addressed by central control unit 12 as is Section A, but rather is addressed via line 61 solely by the multi-line control unit 25 itself. Section A of address memory 57 has only two word locations reserved therein for the 20th input-output channel. The 20th input-output channel, however, receives data from and transmits data over 36 different data communication lines 30. Section B of address memory 57 is reserved exclusively for these data communication lines 30 and contains two word locations therein for each such data communication line. When a particular one of the data communication lines 30 desires access to memory 11, this request is transmitted via multi-line input-output control 25 to central control unit 12. When a memory access for this request is granted by central control unit 12, a data character is transferred between an input-output unit associated with the particular line 30 and a predetermined address in memory 11 reserved for this particular data communication line 30 via information register 42; the predetermined address within memory 11 is selected by means of an address word in a location within Section B of address memory 57 which is reserved for that particular data communication line 30 which has been granted access. This reserved location within Section B of address memory 57 is itself addressed by means of line 61 from multi-line input-output control unit 25. This address from Section B is placed in register 40 to address main memory 11. The address is then counted up two and returned to the same location in Section B. In this manner, successive data characters transmitted via a particular one of the data communication lines 30 will be stored in or read out of adjacent locations within memory 11 despite the fact that many other characters via other ones of the data communication lines 30 may have been received intermediate to characters from the particular data communication line 30.

Figures 2, 3, 5, 6:
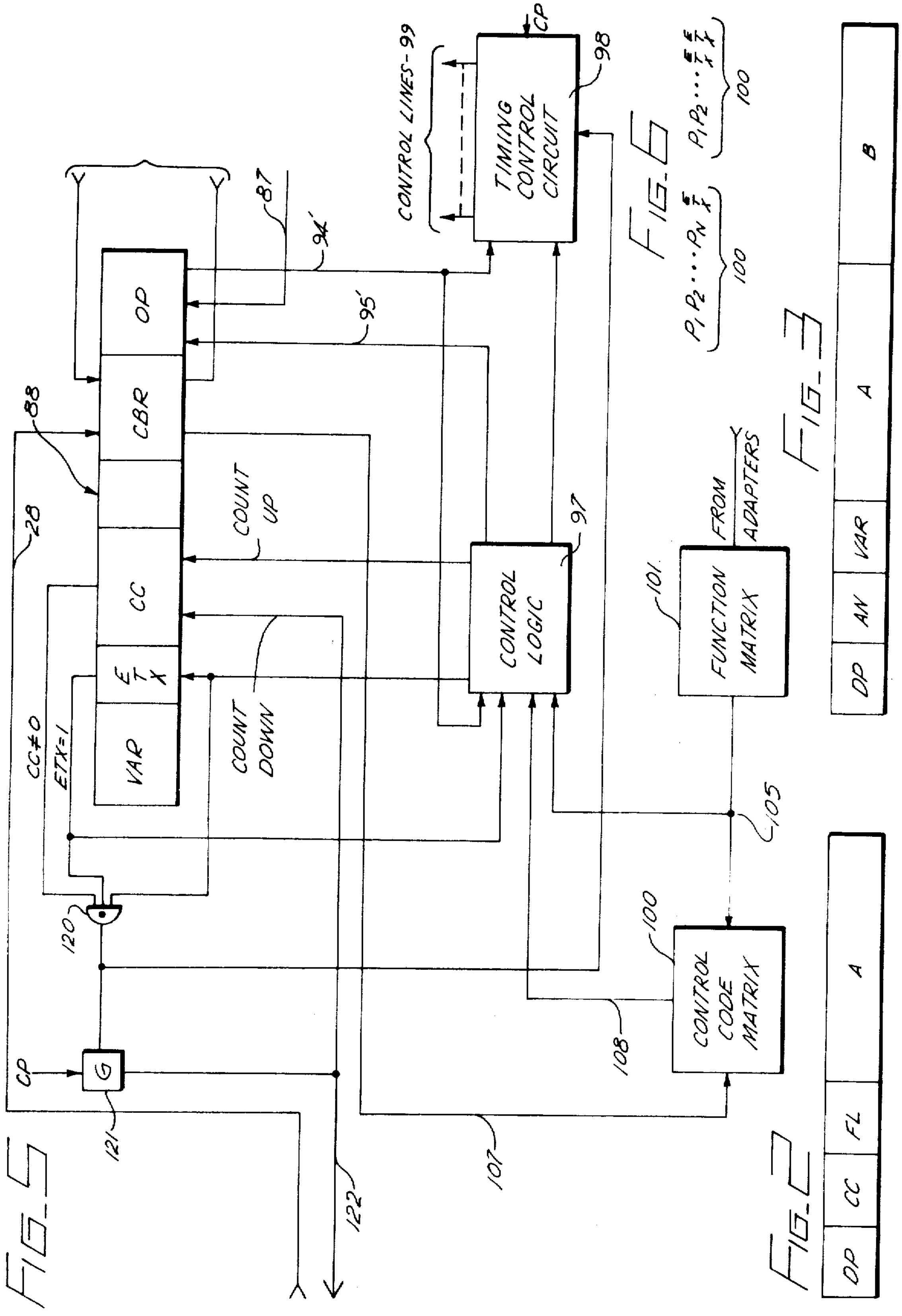
FIGS. 2 and 3 depict the format of a command and descriptor used in the operation of the system shown in FIG. 1.
FIG. 5 shows a portion of the multi-line control unit controlling the recirculating poll operation.

FIG. 2 depicts an "initiate input-output" command for the processor, the execution of which is requested by software associated with the system. This command indicates that an input-output operation is to be executed by the input-output control unit associated with an input-output channel designated by the command. The command shown in FIG. 2 is made up of two syllables, each of which comprises six digits. The first two digits, designated OP, indicate that an input-output command is to be performed. The next two digits, designated CC, indicate the particular input-output channel which is to be utilized. It will be assumed that these digits indicate that the 20th input-output channel associated with multi-line control unit 25 is to be utilized. The next two digits, designated FL, indicate the field length of the input-output descriptor in memory which is to be used by the control unit to execute an input-output operation. It will be assumed that the field length indicated is three syllables. The second syllable of "initiate input-output" command shown in FIG. 2 indicates the address of the input-output descriptor which is subsequently to be used in the input-output operation.

Initially, the Next Instruction Address register 52 will contain the address of the first digit of the OP digits shown in FIG. 2. In a well-known manner the "initiate input-output" command shown in FIG. 2 ill be fetched two digits at a time by the processor and stored in control circuitry 47.

The processor will then execute the "initiate input-output" command by indicating to central control unit 12 via line 51 that an input-output operation is to be executed by control unit 25. Additionally, the processor stores the address in the A Section of the command shown in FIG. 2 in a location in Section A of address memory 57 which is reserved for the processor.

During succeeding memory cycles allocated to the processor, it will fetch the input-output descriptor depicted in FIG. 3. The processor transmits the OP digits, AN digits, and VAR digits of the descriptor shown in FIG. 3 to multi-line control unit 25 and stores the addresses in the A and B Sections of the descriptor shown in FIG. 3 in a word location of Section A of address memory 57 reserved for the processor. Subsequently, processor control circuitry 47 notifies central control 12 via a signal transmitted on line 51 that the fetch of the descriptor depicted in FIG. 3 has been completed. Next the A and B addresses are transferred from Section A via line 63 to address register 40 and subsequently stored in two word locations in Section A of address memory 57 which are reserved for the multi-line control unit 25. At this time execution of the input-output operation is turned over to multi-line control unit 25 and the processor is free to perform other functions.

The OP digits of the descriptor shown in FIG. 3 are coded to indicate that a "write" operation is to be initiated. The VAR digits of the descriptor are coded to indicate that a recirculating poll operation is to be executed. The AN digits of the descriptor designate which of the 36 communication lines is involved in the operation. The manner in which the "recirculating poll" operation is executed by the multi-line control will now be discussed in conjunction with FIGS. 4 and 5 which depict in greater detail the multi-line control unit 25 shown in FIG. 1.

As described above, during the execution of the "initiate input-output" command, the OP, AN, and VAR digits of the descriptor, as they are read out of the main memory 11, are transferred to the multi-line control unit 25 by the central control 12 over the nineteenth input-output channel. The two OP digits received by control unit 25 over line 27 are directed by control circuitry 69 and line 70 to register 71. During a succeeding memory cycle, the AN digits are transmitted to multi-line control unit 25 and directed by control circuitry 69 and line 72 to register 73. Similarly, during a subsequent memory cycle the VAR digits of the descriptor shown in FIG. 3 are transmitted to multi-line control unit 25 and directed to register 74 by control circuitry 69 and line 75.

Figure 4:
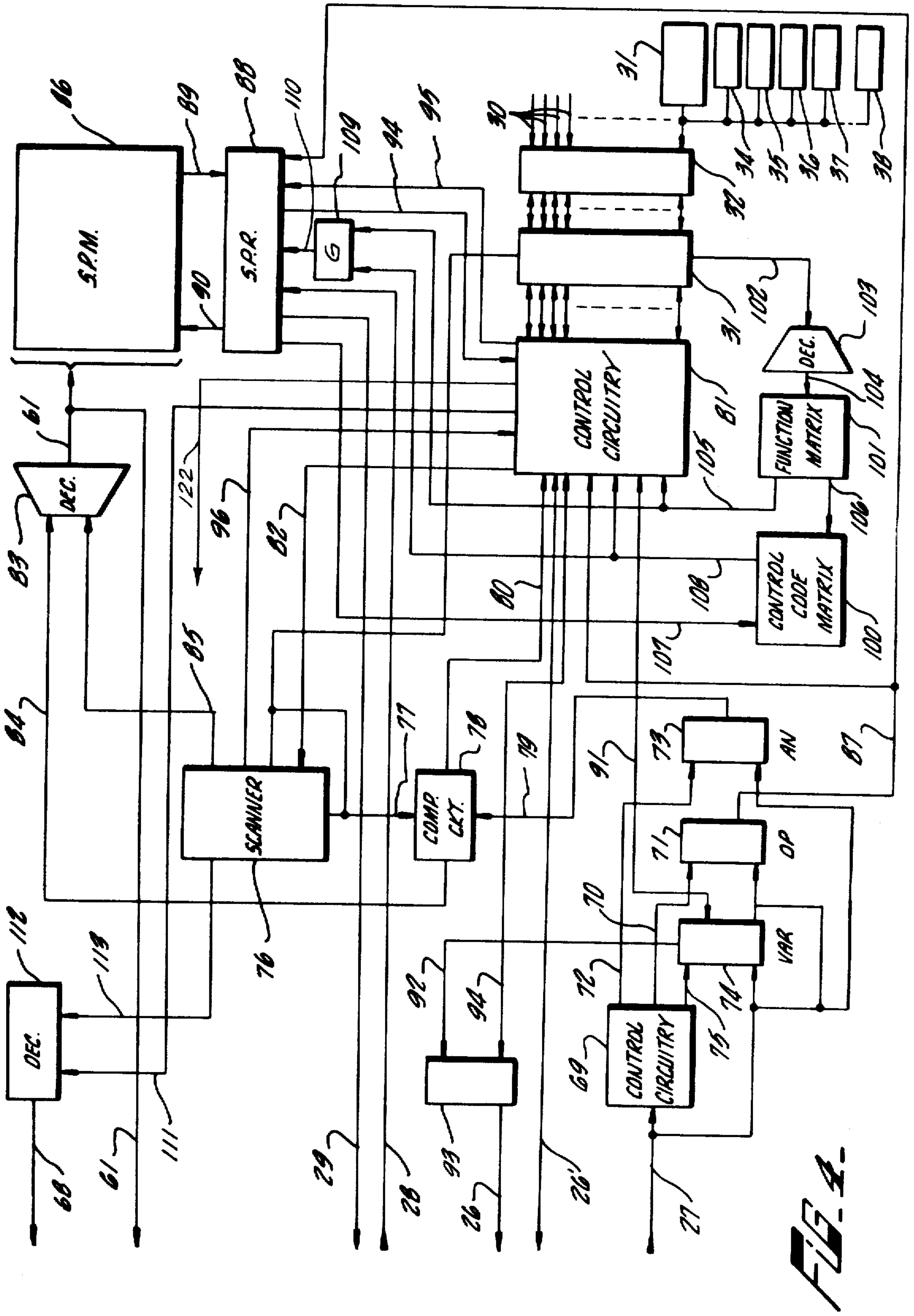
FIG. 4 shows the multi-line control unit of FIG. 1 in more detail.

Scanner 76 sequentially presents signals of 36 output lines 77, shown as a single line in FIG. 4 for purposes of illustrative clarity, which are associated with the 36 line adapters 31. Compare circuit 78 is connected to scanner 76 via lines 77 and is connected to register 73 by line 79. Scanner 76 sequentially scans the 36 line adapters until it scans that adapter which is identified by the contents of register 73. At this time, compare circuit 78 recognizes that scanner 76 is pointing at the line adapter identified by the contents of register 73. When this comparison is made, a signal on line 80 from compare circuit 78 notifies control circuitry 81 that there has been a comparison and control circuitry 81 via a signal on line 82 thereby causes the scanner 76 to stop in this position. A signal on one of 36 output lines 61 is used to address one of 36 word locations contained in scratchpad memory 86 and to address the corresponding word locations reserved in Section B of address memory 57 for a particular one of the 36 data communication lines 30. Scratchpad memory 86 may advantageously be identical in structure to address memory 57. The word locations in scratchpad memory 86 are related to respective ones of the 36 data communication lines 30. The comparison detected by circuitry 78 causes the contents of registers 71 and 74, the OP and VAR digits, to be transferred via line 87 to control circuitry 81 and to scratchpad register 88 and also causes the and B addresses to be transferred to the two word locations in Section B of address memory 57 which are reserved for the specified communication line 30. The scratchpad memory 86 has a word location reserved therein for each of the data communication lines 30. As scanner 76 stops at a particular data communication line, the word in memory 86 reserved for the particular line is read into register 88 via line 89 and written back into memory 86 via line 90 when scanner 76 resumes scanning.

Upon the reception of the OP and VAR digits into register 88, control circuitry 81 inserts a channel result descriptor word into register 74 via line 91, and subsequently causes this word to be transmitted to central control unit 12 via line 26 by means of line 92 and control circuitry 93 in response to a signal applied to line 94 by control circuitry 81. The central control unit 12 inserts into address register 40 via line 67 an address in memory 11 reserved for a channel result descriptor word from multi-line control unit 25. Central control unit 12 then transmits the result descriptor word received over line 26 into this address in memory 11 via line 45 and register 42. Storage of this channel result descriptor word indicates that the descriptor depicted in FIG. 3 has been accepted by multi-line control unit 25 and that the nineteenth input-output channel is again available to accept input-output descriptors directed to other ones of the data communication lines 30 associated with multi-line control unit 25.

At this time, multi-line control unit 25 proceeds to execute the input-output operation. Lines 94 and 95 connect register 88 to control circuitry 81 and line 96 connects scanner 76 to control circuitry 81. Although the lines 94 and 95 are depicted in FIG. 4, for purposes of clarity, as being single lines, in actuality they will comprise a number of lines between register 88 and control circuitry 81. The control circuit 81 in combination with each of the line adapters 31 operates to transfer data between the register 88 and each of the remote input-output units. In U.S. Pat. No. 3,390,379 there is described many of the details of a system for accomplishing this transfer, although much of the function of the control circuit 81 is included within the adapters described in the patent. However, the principles necessary to the design of the control circuitry required in the control circuit 81 and the adapters 31 is well known and can be readily implemented from the teaching of the patent.

FIG. 5 depicts register 88 and lines connected thereto in somewhat greater detail. The section of register 88 in which the OP digits are stored is depicted as an OP section with lines 87, 94′, and 95′ connected thereto. Lines 94′ and 95′ represent two of the lines depicted generally in FIG. 4 as lines 94 and 95. The particular OP digits stored in register 88 are identified to logic circuit 97 and to timing control circuit 98 by means of line 94′. Timing control circuit 98, which is a portion of control circuitry 81, responds to the particular command manifested by the OP digits and in response thereto presents sequential control signals on its output lines 99. Signals on output lines 99 are utilized by control circuitry 81 to present signals to central control unit 12 via line 26′ which controls whether accesses to memory 11 effect a removal of information from memory 11 or a storage of information into memory 11.

The particular OP digits which indicate that a recirculating polling command is to be executed may advantageously be similar to those which denote a "-write" operation. Consequently, in response to bits identifying a recirculating polling command being inserted in the OP position in register 88, timing control circuit 98 will present signals on its outputs 99 which cause the multi-line control unit 25 initially to be in a "-write" state.

During execution of the polling operation, an initial polling message, the first character of which is stored in the address in memory 11 manifested by the A address in the descriptor depicted in FIG. 3, will be transferred by the central control 12 over line 28 to the character buffer section CBR of the register 88. The character in CBR is then transmitted via the first one of the data communication lines 30 to input-output units 34 through 38. Since each of these input-output units is connected to the same data communication line, they will be of the same type and will utilize a single line adapter 31. They may, for example, comprise IBM 1050 computers. Each of the input-output units 34 through 38 will respond to a unique polling address portion of the polling message. Thus, the initial polling message transmitted over the first one of the data communication lines 30 will be directed to a particular one of the input-output units 34 through 38, and this particular one of the units will respond to this polling message. Thus, for example, the first polling message may be directed to input-output unit 34 and, upon its receipt of this polling message, it will respond by transmitting an acknowledgement signal should it have a message to be transmitted or a negative-acknowledgement signal if it should have no message to be transmitted.

Assume, for example, that the first input-output unit 34 has no message to be transmitted to the system and that it consequently transmits a negative-acknowledgment signal comprising a single character. The input-output control unit 25 is automatically switched from its "write" state to a "read" state in order to be ready to receive the negative-acknowledgment signal from input-output unit 34.

Control code matrix 100 and function matrix 101 shown in FIG. 4 are utilized to determine the proper time for the switching of multi-line input-output control 25 from one state to the other. During the execution of an input-output command by control unit 25, the line adapter 31 associated with the selected one of the data communication lines 30 presents signals on adapter identification bus 102 which identify the type of input-output unit associated with the selected data communication line 30. As described in greater detail in the copending application of James Russell Bennett referred to hereinabove, these identification signals on bus 102 are decoded by decoder 103. Decoder 103 then presents a signal on one of a plurality of output lines 104 which in turn is used by function matrix 101 to present signals on particular ones of a number of function control lines 105. Signals on these lines 105 are utilized to identify to control circuitry 81 the type of input-output units associated with the selected data communication line. Additionally, function control lines 105 from function matrix 101 are transmitted to control code matrix 100. Control code matrix 100 utilizes these signals to select a particular control code card within matrix 100. A character being transmitted between control unit 25 and the selected data communication line 30 and temporarily stored in register 88 is compared via line 107 with a set of control code characters manifested on the selected one of the control code cards. If a comparison is made, indicating that the character being compared is a control code character, a signal is presented to control circuitry 81 via lines 108. Both the function matrix 101 and control code matrix 100 may advantageously be made up of removable cards which contain integrated circuitry thereon.

As a polling message is transmitted via the first data communication line 30 to the input-output units 34 through 38, control code matrix 100 recognizes all control code characters within this message. When a polling message transmitted via the first data communication line 30 to input units 34 through 38 terminates, the control code matrix 100 recognizes an "end of message" control character and in response thereto presents a signal on one of the lines 108 which indicates that the end of the message has been detected. This signal, in conjunction with a signal on one of the lines 105, is presented to gate circuit 109 which, responsive thereto, presents a signal on its output line 110 which clears the message control register. The signal on line 108 is also presented to logic circuit 97 which, in response thereto and to a signal presented on line 94', presents a signal on line 95' which effects a change in the OP digits stored in register 88. The OP digits stored in register 88 are changed to indicate that a "read" portion of the "poll" command is now to be executed. Upon being so changed, the new OP digits stored in register 88 present a signal on line 94' to timing control circuit 98 which causes circuit 98 to present signals on output lines 99 effective to switch multi-line control unit 25 from its "write" state to a "read" state. Thus, it is seen that multi-line input-output control unit 25 is automatically switched to a "read" state when the end of a polling message is detected during the execution of a polling command.

Subsequent to the end of the first polling character the input-output unit 34, assumed to be the particular unit interrogated by this first polling message, transmits a message in response thereto. It will further be assumed that this responsive message is a single character negative-acknowledgment message indicating that the input-output control unit does not have a message to be sent to the system. The transmitted negative-acknowledgment character is itself detected over line 107 by control code matrix 100 which presents signals indicative of such detection on lines 108. These signals on lines 108 in conjunction with the OP digits now present in register 88, and manifested by signals presented on lines 94', cause logic circuit 97 to present signals on lines 95' which reinstate the initial OP digits in register 88. These OP digits in register 88 then present signals on lines 94' to timing control circuit 98 which cause it again to present signals on lines 99 which are effective to switch multi-line input-output control unit 25 automatically back to its "write" state. Each time the multi-line input-output control unit 25 is switched from one state to the other, signals presented on lines 108 and 105 to gate circuit 109 effect signals on line 110 which reset the message control register portion of register 88.

After the negative-acknowledgement reply signal received from input-output unit 34 has been detected, a second polling message is transmitted to the units 34 through 38 via the first data communication line 30. This second polling message will be read from addresses in memory 11 which follow immediately after the first polling message read from memory 11. Thus, the address A shown in the command depicted in FIG. 3 indicates the address of the first polling character and immediately thereafter memory 11 will store succeeding polling characters.

The second polling character transmitted via the first data communication line 30 will be assumed to be addressed to the input-output unit 35. At the completion of this polling message the multi-line input-output control unit 25 will again be switched to its "read" state in the manner described previously. If input-output unit 35 also responds with a negative-acknowledgment signal, the multi-line input-output control unit 25 will again be switched to its "write" state as described previously and a third polling message will be transmitted via this data communication line 30. The end of this polling message will similarly be detected and multi-line input-output control 25 will again switch to its "read" state. If this "read" polling message is assumed to be directed to input-output unit 36 and this unit does have a message to be transmitted to the system, it will respond by transmitting this message via the first data communication line 30. Multi-line input-output control unit 25 is in its "read" state and ready to receive this message. The message will be stored in the address locations in memory 11 immediately succeeding the addresses wherein the third polling message was stored. At the completion of the message transmitted by input-output unit 36, control code matrix 100 will detect the end of this message and in response thereto control circuitry 81 will present a signal on line 111 to decoder 112. Additionally, scanner 76 presents a signal on line 113 to decoder 112. In response to these signals, decoder 112 presents signals on lines 68 to address register 40 and central control unit 12 stores an adapter result descriptor in memory 11 at the address therein specified by the signals presented to address register 40 by line 68. The adapter result descriptor is assembled in register 74 and thence transmitted to central control unit 12 by control circuitry 81 in a manner similar to that previously described with respect to the channel result descriptor.

The control word stored in the scratchpad memory for each of the communication lines includes certain control bits, one group of which is designated the control counter. When the control word is transferred to the scratchpad register 88, the control counter bits occupy a portion of the register designated CC. Another control bit of a control word when stored in the register 88 occupies a portion designated ETX. According to the present invention a polling string is divided up into blocks or segments of 100 characters each. Such a polling string consisting of two such blocks is illustrated in FIG. 6, wherein each polling message is designated as a $P_1$ through $P_n$. It will be understood that each polling message may consist of several characters including address characters, a poll-identification character, and an end-of-poll-message character. The 100th character in all but the last block of the string is a single ETX control character. The last two characters of the last block in the string are ETX characters. The programmer must follow this format in establishing the polling string as it is stored in the main memory.

As the polling messages in the string are transmitted one by one to the remote station and negative-acknowledgment characters are returned, the first ETX character will ultimately be read out of main memory into the CBR portion of the register 88 over the line 28 in the manner described above. The ETX character, when sensed by the control code matrix 100, provides a corresponding signal to the control logic 97 over the output line 108. The control logic circuit 97 turns on the ETX bit in the register 88. However, the ETX character is not transmitted to the remote station. Instead, the control circuit 98 is reset to cause the next character to be read out of main memor into the CBR section of register 88.

Also, the ETX character, when encountered in the CBR portion of the register 88, causes the control logic 97 to count up the count control bits CC by 1. Thus the count control bits keep track of the number of blocks of polling messages which have been transmitted to the remote station over the communication line.

The above process continues as long as negative-acknowledgments are received from the remote station in response to each polling message until the end of the last block in the polling string is encountered. The first of the pair of ETX characters encountered at the end of the last block of the string turns on the ETX bit and counts up the CC field by one exactly in the manner described above. When the second ETX character is read out of memory the output of a logical AND circuit 120 goes true. The AND circuit 120 senses that the CC field is not zero, that the ETX bit has already been turned on, and that an ETX character has been sensed through the control logic 97. Thus the AND circuit 120 goes true whenever two ETX characters are encountered in succession and the CC field is not zero.

The output of the logical AND circuit 120 activates a gate 121 which passes clock pulses CP to an output line 122. Line 122 is used to count down the CC field. Thus after a predetermined number of pulses is passed by the gate 121, the CC field is counted back down to zero, terminating the transfer of pulses by the gate 121 to the line 122.

The line 122, as seen in FIG. 1, is applied through the central control 12 to a countdown-by-100 circuit 124, the output of which decrements the address in the address register 40 by 100. Thus, depending on the count condition of the CC field at the time the end of the polling string is encountered, the address register will be decremented by an integral number of steps of 100. By this process, the address in the address register 40 is automatically reset to the initial address of the polling string stored in the main memory 11. After being decremented, the address in the register 40 is returned to its location in the B Section of the memory register 57, as described above. The multi-line control 25 is now in condition to repeat the polling of the remote station by the polling string stored in memory. Thus a recirculating poll operation is provided which can continue indefinitely without intervention of the processor until a message other than a negative-acknowledgment is returned by one of the I/O units. The processor can, of course, terminate the polling operation at any time by executing a special command which sends a cancel descriptor to the multi-line control 25.

All of the circuits shown in block form in the drawing are of a type well known to persons skilled in the art. The control logic and control circuitry necessary to perform the function specified for these circuits involve conventional control logic and timing techniques.

What is claimed is:

1. The method of continuously polling a plurality of remote terminal units over a common transmission line, comprising the steps of storing a group of characters comprising a string of polling messages in an addressable memory in consecutive address locations, inserting a special character into the stored polling string at equal address intervals, transmitting each of the polling messages in sequence from the memory to the remote terminal units, providing a special character condition indicating the end of the polling string stored in the memory, and addressing the start of the polling string in memory in response to the special character condition indicating the end of the string to repeat the transmission of the polling string.

2. The method of claim 1 further including the steps of: counting the special characters in the polling string, addressing the start of the program string in memory at an address determined by the address of the special character condition at the end of the polling message minus a predetermined multiple of the number of special characters counted in the program string.

3. The method of claim 2 wherein the polling string stored in memory has a number of addressable characters that is an integral multiple of said address interval of the special characters.

4. In a data communication system in which digital characters are transferred between an addressable memory and a plurality of addressable remote terminals through an input-output control unit over a single transmission line, apparatus for continuously polling the remote terminals in any predetermined sequence from a string of polling messages stored in consecutive address locations in the memory starting at a predetermined address, comprising register means storing said predetermined address, means utilizing the address in said register for transferring the contents of said predetermined address in memory to said transmission line and incrementing the register to the next address in the polling message, means utilizing the incremented address for transferring the contents of memory from successive addresses to the transmission line, and means sensing the last character in the polling message string when transferred out of memory for resetting the register to the initial address, whereby the polling message string is repeatedly read out of memory to the transmission line for transmission to the remote station.

5. Apparatus as defined in claim 4 wherein said resetting means includes means sensing a special character in said polling message, means responsive to the sensing means for counting the number of such special characters, and means responsive to the counting means when the last character in the polling message is sensed for decrementing the register by an integral multiple of count condition of the counting means.

6. In a data communication system in which digital characters are transferred between an addressable memory and a plurality of addressable remote terminals through an input-output control unit over a single transmission line, apparatus for continuously polling the remote terminals in any predetermined sequence from a string of polling messages stored in the memory starting at a predetermined address, comprising register means storing said predetermined address, means utilizing the address in said register for transmitting the polling messages from sequential address locations in memory over said transmission line, means for incrementing the address in the address register as each addressable portion of the polling string is transferred out of memory to the transmission line, the string of polling messages in memory including control characters at predetermined equal address increments, means responsive to said control characters as they are transferred out of memory for counting the number of said address increments in the polling message, means sensing the end of the polling string when the last message is read out of memory, and means responsive to said counting means for decrementing the address in said register a number of times determined by the state of said counting means.

7. Apparatus for polling a plurality of remote terminal units comprising a main memory, a plurality of data communication lines for transmitting information to the remote terminal units, an address memory having a word location reserved therein for each data communication line, multi-line control means for selectively coupling the data communication lines to the main memory over a single channel, the word location for at least one data channel in the address memory storing the base address of a string of polling message stored in sequential address locations in the main memory, an address register, the multi-line control means including means responsive to the selection of the particular one of the data communication lines for addressing the corresponding location in the address memory to write the address into the address register, means responsive to the address in the address register for addressing the main memory to transfer a word of the polling message to the communication line, means incrementing the address in the register and restoring it to the same location in the address memory, counting means associated with each communication line, means responsive to a first predetermined control word in the polling message when read out of main memory for incrementing the associated counting means, and means responsive to a second predetermined control word in the polling message when read out of main memory for decrementing the address in said location in the address memory by an amount proportional to the count condition of said counting means.

8. Apparatus as defined in claim 7 wherein the multi-line control means includes a control word memory for storing a control word for each data communication line, a control register for receiving from said control word memory the control word associated with the particular data communication line being serviced by the multi-line control means, the control word including bits coded to indicate that a polling message is being transferred by the particular data communication line, the register including said counting means whereby a field of the control word in the control register stores said count condition, said means incrementing the counting means being responsive to the coded bits in the control word indicating that a polling message is being transferred by the associated data communication line for incrementing the counting means only when a polling message is being transmitted.

9. Apparatus as defined in claim 8 wherein the means for decrementing the associated address stored in the address memory includes means for subtracting the count condition of the count field of the control word in the control register from a portion of the address in the address register of the main memory.

10. Apparatus of claim 9 wherein the subtracting means includes means for simultaneously counting the count field down to zero and simultaneously counting a higher order digit of the address in the address register by the same number of counts.

* * * * *